United States Patent
Liu (10) Patent No.: US 7,141,989 B1
(45) Date of Patent: Nov. 28, 2006

(54) METHODS AND APPARATUS FOR A MEMS VARACTOR

(75) Inventor: Lianjun Liu, Gilbert, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 11/401,592

(22) Filed: Apr. 10, 2006

(51) Int. Cl.
*G01R 27/26* (2006.01)
*H01L 21/20* (2006.01)
*B01B 7/02* (2006.01)

(52) U.S. Cl. .................. 324/661; 438/379; 257/312
(58) Field of Classification Search ............... 324/661; 438/379; 257/312
See application file for complete search history.

(56) References Cited

U.S. PATENT DOCUMENTS

| | | | |
|---|---|---|---|
| 5,847,453 A * | 12/1998 | Uematsu et al. | 257/728 |
| 6,355,534 B1 | 3/2002 | Cheng | |
| 6,387,769 B1 * | 5/2002 | Dekker et al. | 438/379 |
| 6,441,449 B1 * | 8/2002 | Xu et al. | 257/414 |
| 6,507,475 B1 | 1/2003 | Sun | |
| 6,803,774 B1 * | 10/2004 | Park | 324/661 |

OTHER PUBLICATIONS

Yeh, Chingwen and Najafi, Khalil; A Low-Voltage Tunneling-Based Silicon Microaccelermeter, IEEE Transactions on Electron Devices, vol. 44, No. 11 pp. 1875-1882 , Nov. 1997.
Gogoi, Bishnu; Wang, Chuan Che; Mastrangelo, Carlos; Force Balanced Micromachined Pressure Sensors, IEEE Transactions on Electron Devices, vol. 48, No. 8, pp. 1575-1584, Aug. 2001.

* cited by examiner

*Primary Examiner*—Anjan Deb
(74) *Attorney, Agent, or Firm*—Ingrassia, Fisher & Lorenz (57) ABSTRACT

A micro-electro mechanical system (MEMS) variable capacitor (varactor) generally includes a substrate (102), a first capacitive plate (112) formed on the substrate, a flexible structure (150) coupled to the substrate, a second capacitive plate (116) and a first electrode (122) formed on the flexible structure; a package seal (104) coupled to the substrate and having a second electrode (106) formed thereon, wherein the distance between the first capacitive plate and the second capacitive plate (and hence, the capacitance of the structure) is responsive to a bias voltage applied to the electrodes.

20 Claims, 6 Drawing Sheets

METHODS AND APPARATUS FOR A MEMS VARACTOR

TECHNICAL FIELD

The present invention relates generally to micro-electromechanical systems (MEMS) and, more particularly, to an improved MEMS varactor structure.

BACKGROUND

Micro-electromechanical systems (MEMS) technology has achieved wide popularity in recent years, as it provides a way to make very small mechanical structures using conventional batch semiconductor processing techniques. One such device is the MEMS variable capacitor, or varactor.

It is desirable for a varactor to have a wide usable range of capacitance values. Unfortunately, the tunable range of a MEMS varactor is severely limited by its initial air gap dimension. For a typical analog varactor, due to electrostatic pull-in phenomena, the typical tunable range is about 33% of its initial (un-driven) state. In a binary varactor, the tuning ratio ($C_{on}/C_{off}$) is typically between 5:1 to 30:1, depending upon its initial gap and actuation voltage.

This limitation is sometimes addressed by increasing the initial air gap distance between capacitive plates. The larger the initial air gap, the higher the tuning ratio. At the same time, however, larger initial air gaps give rise to increase actuation voltage.

Furthermore, in such prior art systems, the MEMS varactor is fabricated first, then sealed in an enclosing package. This increases processing steps and results in a device that is relatively large and complex.

Accordingly, it is desirable to provide compact MEMS varactor structures that have a wide tunable range and/or tuning ratio. Other desirable features and characteristics of the present invention will become apparent from the subsequent detailed description and the appended claims, taken in conjunction with the accompanying drawings and the foregoing technical field and background.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the scope or application of possible embodiments. Furthermore, there is no intention to be bound by any expressed or implied theory presented in the preceding technical field, background, brief summary or the following detailed description.

Various embodiments may be described herein in terms of functional and/or logical block components and various processing steps. It should be appreciated that such block components may be realized by any number of hardware, software, and/or firmware components configured to perform the specified functions. For the sake of brevity, conventional techniques related to semiconductor processing, MEMS processing, and varactor technology are not described herein.

In general, a MEMS varactor in accordance with one embodiment incorporates one or more actuation electrodes on the surface of the MEMS package itself. The resulting structure is compact and exhibits increased tunable range and a better tuning ratio.

Referring to the cross-sectional overview shown in FIG. 1, an exemplary MEMS varactor 100 in accordance with one embodiment will now be described. As a preliminary matter, it should be noted the figures are not intended to be scale drawings, and that the relative dimensions of layers and spacing as shown are merely to assist with illustrating the embodiments conceptually.

Figure 1:
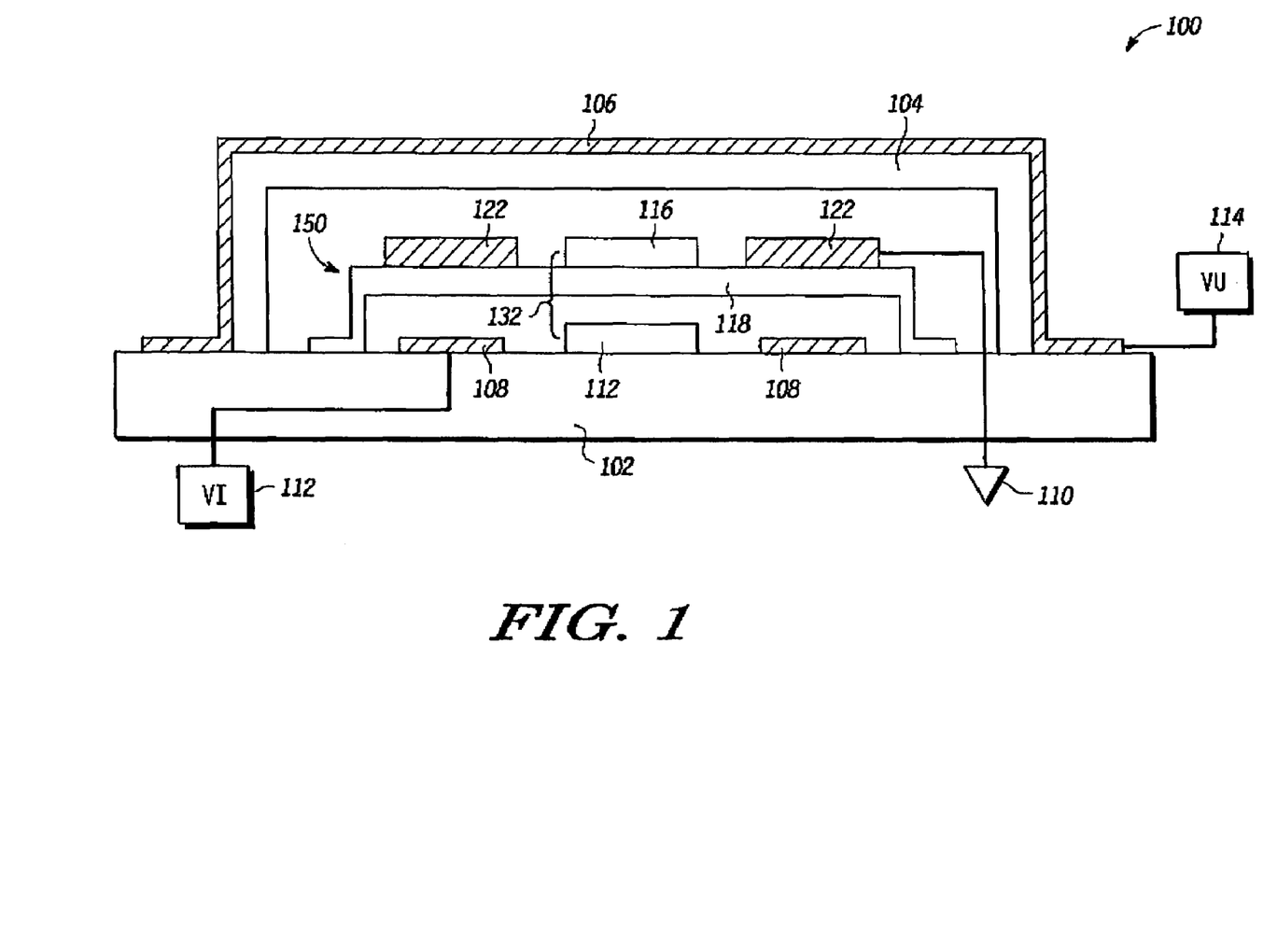
FIG. 1 is a cross-sectional overview of a MEMS varactor in accordance with one embodiment.

As shown in FIG. 1, a MEMS varactor 100 includes a substrate 102 (e.g., a semiconductor substrate or the like) and a package seal (or "cap") 104 mechanically coupled to substrate 102 such that package seal 104 helps protect interior components. A central flexible component 150 includes one or more moveable actuation electrodes (or "central electrodes") 122, one or more dielectric mechanical layers 118, and a top capacitive plate (or simply "top plate") 116. A corresponding bottom capacitive plate (or simply "bottom plate") 112 and one or more lower driving electrodes 108 are provided on substrate 102. An upper driving electrode (or set of electrodes) 106 is provided on an outer surface of sealing layer 104. In this regard, electrode 122 (as well as electrodes 108 and 106) may consist of a single contiguous electrode (e.g., a single conductive layer surrounding a capacitive plate), or may consist of a plurality of individual electrode segments.

The central flexible component 150 is mechanically coupled or anchored (directly or indirectly) to substrate 102 in any suitable configuration. Varactor component 150 as illustrated is thus capable of bending such that top plate 116 experiences up-and-down movement with respect to bottom plate 112.

Operation of varactor device 100 generally proceeds as follows. When a suitable combination of voltage values are applied to upper electrode 106 ($V_u$) and/or bottom electrode 108 ($V_1$) with respect to moveable electrodes 122 (which may be connected to a ground node 110), an electrostatic force develops between electrodes, causing the distance 132 between capacitive plates 112 and 116 to be altered.

As is well known, the capacitance of a parallel plate capacitor is proportional to the area of the plates and the dielectric constant of the insulator, and is inversely proportionate to the distance between the plates (i.e., inter-plate distance 132). Thus, the capacitance of varactor 100 can be adjusted by control of the drive voltages to increase or decrease this distance. All other things being equal, as interplate distance 132 increases, the capacitance of the varactor decreases, and vice versa.

A variable capacitor has a maximum tunable capacitance $C_{max}$ and a minimum tunable capacitance $C_{min}$. The tunable range of the capacitor is the difference between these values, i.e., $C_{max} - C_{min}$. In typical MEMS capacitors, the minimum capacitance corresponds to the "off" (unbiased) rest condition of the moveable plate. Thus the range and tuning ratio (ratio of $C_{max}$ to $C_{rest}$) are limited by the rest state of the plate.

In accordance with the present invention, however, moveable plate 116 can be electrostatically placed in an initial condition that results in an interplate distance 132 greater than its rest state. More particularly, an appropriate voltage (e.g., a positive DC voltage) can be applied to top drive electrode 104 ($V_u$) with respect to electrodes 122 such that an electrostatic force arises between electrode 106 and electrodes 122 and the central region of structure 150 deforms upward, increasing interplate distance 132, and thereby reducing the capacitance $C_{var}$ of the varactor. Thus, $C_{var}$ has a minimum value $C_{min}$ when $V_u$ is set to $V_{u,max}$, and has a maximum value $C_{max}$ when $V_1$ is set to $V_{1,max}$, where $C_{var}$ varies continuously within this range. The rest value, $C_{rest}$, corresponds to the case where both $V_u$ and $V_1$ are 0. During operation, $V_u$ may be reduced continuously from $V_{u,max}$ to zero, then $V_u$ can be increased from zero to $V_{1,max}$. In this way, by increasing the starting distance between the two plates 116 and 112, the range and tuning ratio can be greatly increased over that of standard MEMS analog or binary varactors—e.g. by a factor of two or greater.

The particular values of $V_{1,max}$, $V_{u,max}$, and the corresponding minimum and maximum capacitance values may be specified using known electro-mechanical relationships, selecting the desired plate sizes, plate spacing, plate geometry, effective stiffness of structure 150, the anchoring scheme for structure 150, etc. For example, with proper selection of structural materials and dimensions, an initial air gap of 3 um may achieve a $C_{on}/C_{off}$ ratio of between 20–30:1 and $V_{1,max}$ and $V_{u,max}$ of between 20–30 volts. An initial air gap of 1.5 um may achieve a $C_{on}/C_{off}$ ratio of between 10–15:1 and $V_{1,max}$ and $V_{u,max}$ of between 10–15 volts. It will be understood, however, that the invention is not so limited. The actuation voltage may be DC, AC, or have any arbitrary waveshape suitable for the application. Similarly, the voltage may be negative or positive.

The static and dynamic properties of the varactor structure (e.g., the effective spring constant of the structure) may be specified given the various constituent layers using standard mechanical methods known in the art (e.g., empirical methods, finite-element modeling, closed-form calculations, or the like). The dimensions of varactor structure 150 may be selected to achieve the desired stiffness (k), range, actuation distance, stability, and the like. In exemplary embodiments, dielectric layer 118 has a thickness ranging from about 0.3 microns to 5 microns.

Figure 2:
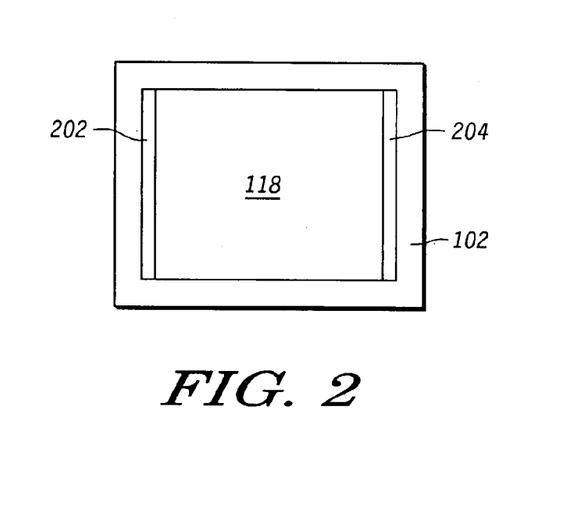
FIGS. 2 and 3 are conceptual top-views of mechanical structures in accordance with various embodiments.
Figure 3:
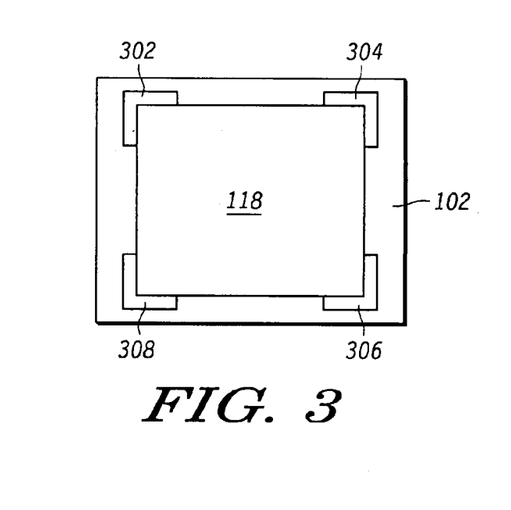

Referring to FIG. 2, the flexible structure may be generally rectangular wherein layer 118 is anchored to substrate 102 at two opposite sides as indicated by reference numerals 202 and 204 (a "bridge" structure). It may also be a "trampoline" structure, as shown in FIG. 3, where each corner (302, 304, 306, 308) is anchored to substrate 102. A standard cantilever structure may also be used. Indeed, it will be appreciated that structure 150 (and layer(s) 118) may have any desired dimensions and shape (e.g., rectilinear, curvilinear, or a combination thereof) and be anchored at any number of points along its perimeter.

Figure 5:
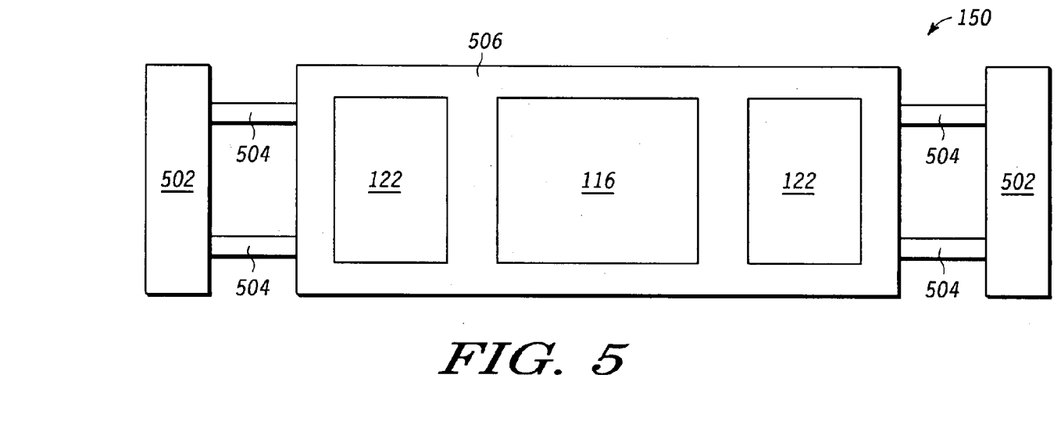
FIGS. 5–8 are top view conceptual diagrams of a device structure in accordance with various embodiments.
Figure 6:
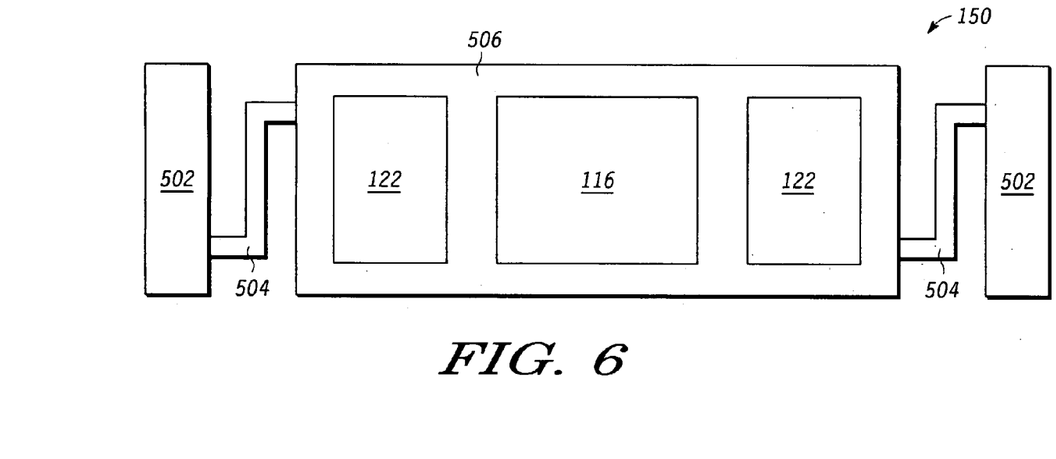
Figure 7:
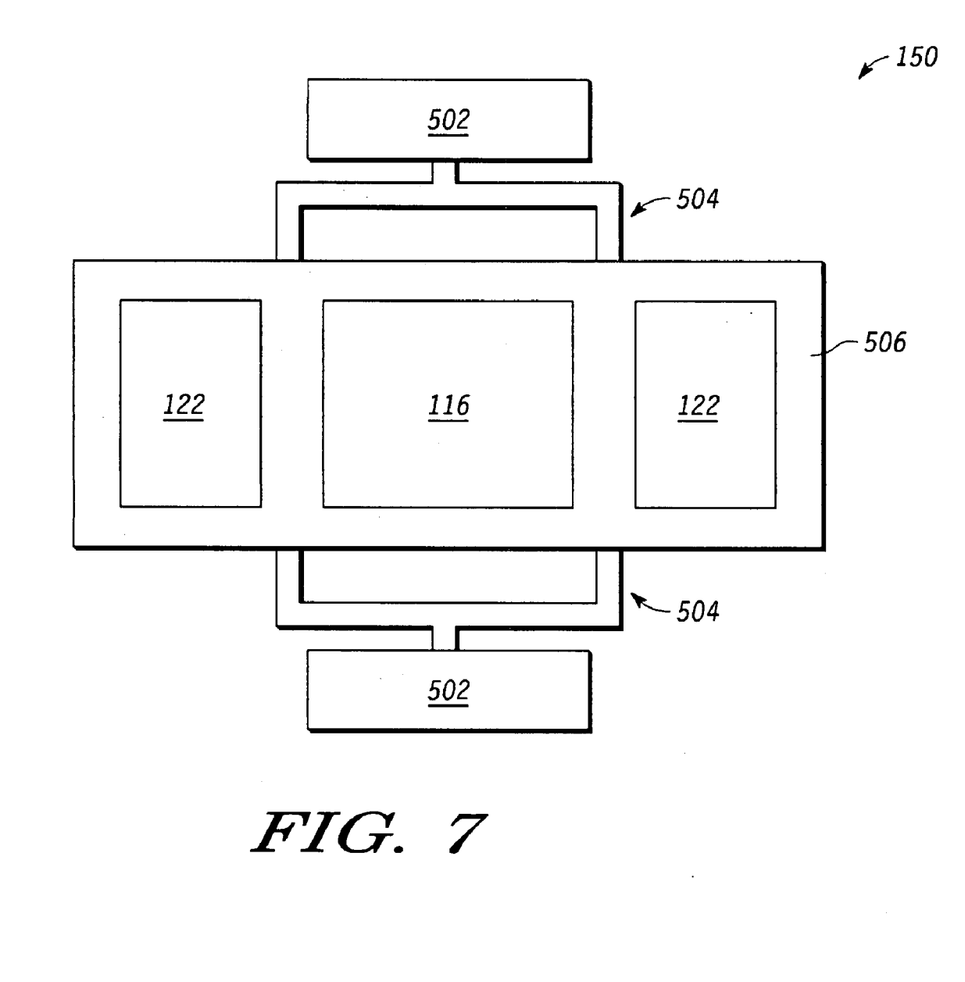
Figure 8:
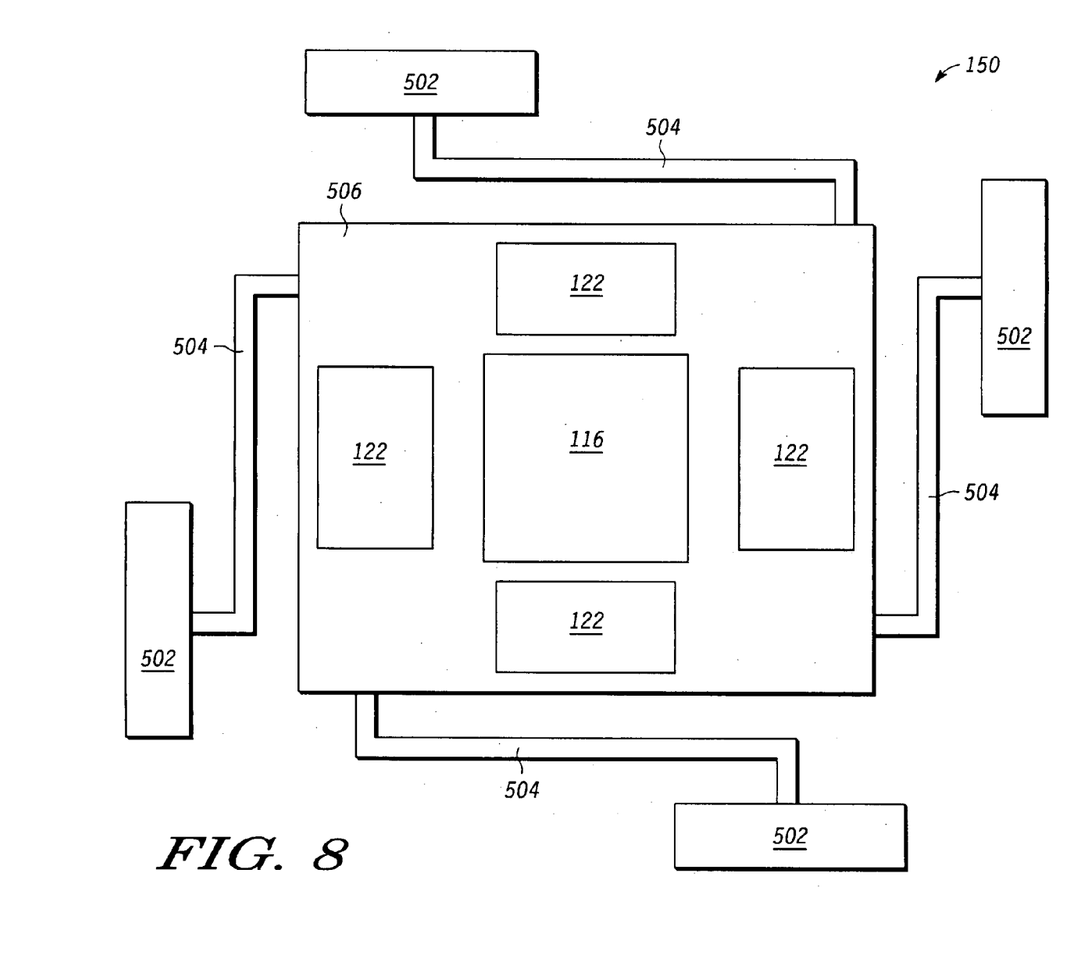

In this regard, FIGS. 5–8 depict a number of different designs for structure 150, along with example placement of capacitor 116 and electrodes 122. In FIG. 5, for example, structure 150 is generally connected to the substrate (not shown) by anchor regions 502 on opposite sides of central region 506. A series of relatively thin members 504 extend from anchor regions 502 to region 506, and electrodes 122 are placed on opposite sides of capacitor 116. FIG. 6 shows a variation of the design shown in FIG. 5, wherein the multiple linear members 504 are replaced with single (opposing) "s-shaped" members 504. FIG. 7 depicts an alternate structure wherein "y-shaped" members 504 extend from two opposing anchor regions 502 to central region 506, and FIG. 8 depicts the use of four "s-shaped" members 504 extending from respective anchor regions 502 to a rectangular central region 506. In this embodiment, capacitive plate 116 is surrounded on four sides by electrodes 122.

Figure 4:
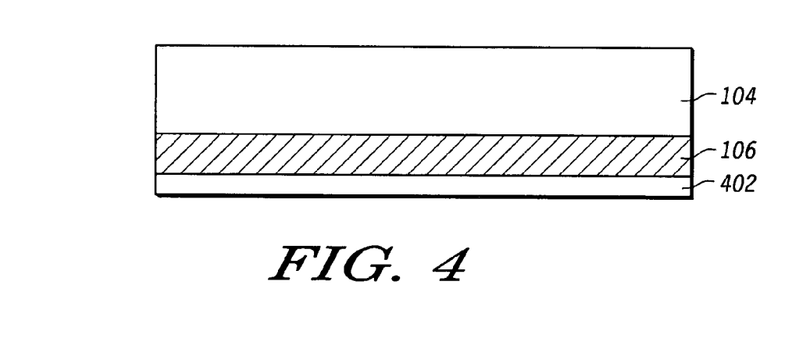
FIG. 4 is a cross-section of a device lid close-up in accordance with an alternate embodiment.

While the embodiment illustrated in FIG. 1 depicts upper electrode 106 formed on the external surface of package seal 104, the electrode may alternatively be formed on an interior surface. Referring to FIG. 4, for example, electrode layer 106 may be formed on the interior (bottom surface, in FIG. 4) of package seal 104, and then provided with a protective dielectric layer 402 to prevent electrical shorting between middle electrode 122 and top electrode 106.

Figure 9:
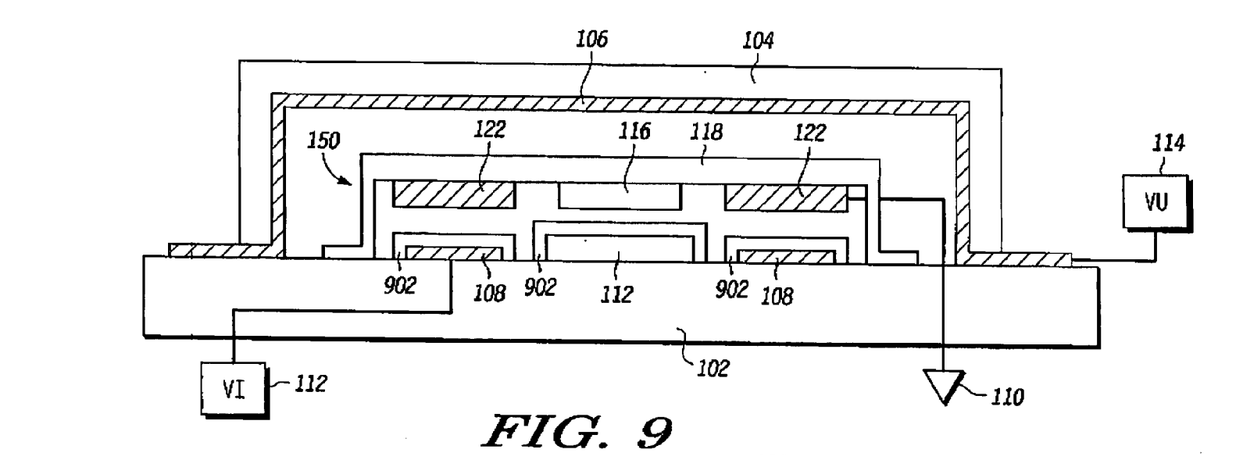
FIG. 9 is a cross-sectional overview of a MEMS varactor in accordance with an alternate embodiment.
Figure 10:
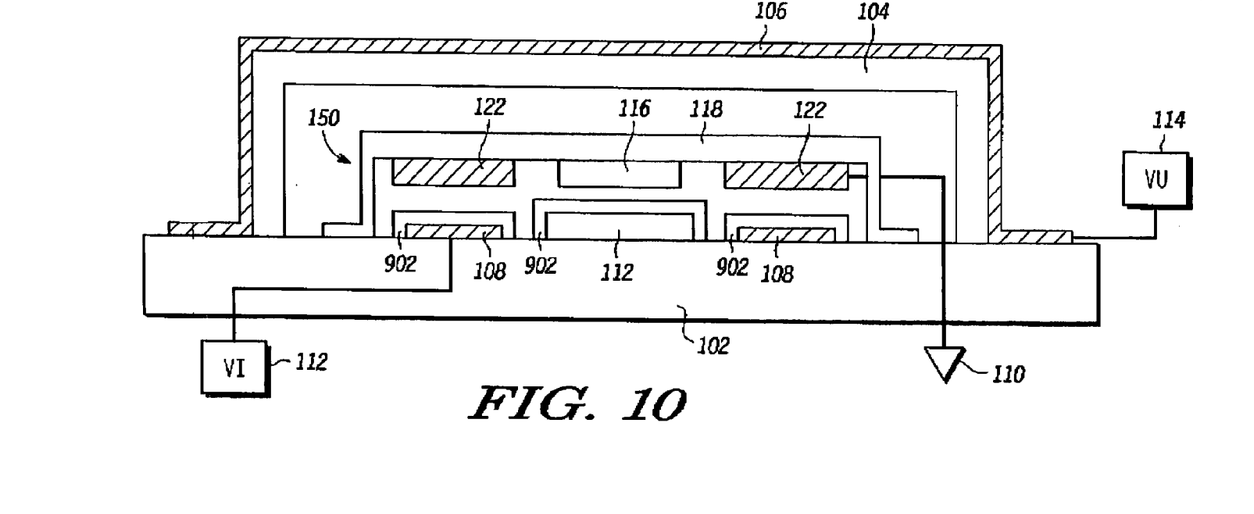
FIG. 10 is a cross-sectional overview of a MEMS varactor in accordance with an alternate embodiment.

In an alternate embodiment, the central electrodes and capacitive plate are placed on the underside of flexible structure 150. That is, referring to FIGS. 9 and 10, electrodes 122 and capacitive plate 116 are fabricated along the underside of structure 118 of structure 150. In such an embodiment, it is preferable to include a dielectric layer 902 over opposing electrodes 108 and plate 112 to prevent electrical shorting between the components. Upper electrode may be placed on the underside of sealing layer 104 (as shown in FIG. 9), or on the topside of sealing layer 104 (as shown in FIG. 10).

It will be understood that various electrical interconnects (e.g., signal lines) will extend from nodes outside of device 100 to electrodes 106, 122, 108 as well as plates 116 and 112. For the purpose of simplicity, such interconnects are merely shown conceptually. Such metal traces, electrodes, shorting bars, and transmission lines may be formed from any material or combination of materials, including, for example, aluminum, titanium, chromium, platinum, gold, tungsten, nickel, copper, polysilicon, and the like. In one embodiment, the electrodes are fabricated from aluminum, gold, or polysilicon.

Substrate 102 may comprise any suitable material—for example, a ceramic, a glass, a semiconductor (Si, Ge, GaAs, etc.), or any of the various high-resistivity substrates used in connection with RF devices. Dielectric layers may be formed from, for example, silicon dioxide, silicon nitride, silicon oxynitride, or any other suitable dielectric material.

Having thus given an overview of an example MEMS varactor structure, a method of forming the device will now be described with reference to FIG. 1. It will be appreciated that the described process may include additional processing steps and might also be just one part of a larger method. Furthermore, while the process steps may be shown as being performed on only a small portion of the substrate, it will be understood that the steps may be performed on multiple devices simultaneously through wafer-level processing. The fabrication of bulk-machined and surface-machined MEMS structures using conventional photolithography, wet and dry etching, oxidation, diffusion, chemical vapor deposition, and sputter deposition techniques is well known, and thus need not be discussed in detail herein.

First, a suitable substrate is provided. As mentioned earlier, substrate 102 may be any suitable material, e.g., a semiconductor wafer or any other conventional substrate material. Bottom driving electrode or electrodes 108 and bottom capacitor plate 112 are formed on substrate 102. Formation of these structures may be accomplished using any conventional metal deposition technique, followed by standard photoresist deposition and etching.

Next, a sacrificial layer (not shown) is formed over electrode 108 and plate 112. As used in the art, a "sacrificial layer" is a layer of material that is deposited in order to assist in fabrication of the desired structures, but which is removed during subsequent processing. A number of materials are suitable for use as sacrificial layers, including, for example, polyimide, parylene and other polymers, porous silicon, and various dielectrics materials. In one embodiment, for example, a conventional photoresist material is used to form the sacrificial layers.

Next, structural layer 118 is deposited and patterned over the sacrificial layer. Mechanical layer 118 may be, for example, silicon dioxide, silicon nitride, or silicon oxynitride deposited using conventional CVD techniques. This is followed by deposition and patterning of movable electrode 122 and top capacitor plate 116. In an alternate embodiment (described previously in conjunction with FIGS. 9 and 10), moveable electrode 122 and top capacitor plate 116 are formed prior to mechanical layer 118.

Next, a second sacrificial layer (not shown) is deposited over the underlying structures and patterned. A dielectric sealing layer is deposited and patterned over the second sacrificial layer. That is, lid 104 is preferably deposited and pattern such that it includes a number of holes or other structures that allow etching of the sacrificial layers within.

Next, the internal sacrificial layers are removed (using, for example, wet or dry etching techniques) to affect structure release. This is followed by deposition of a second dielectric sealing layer that functions to cover the pattern of holes or other patterns etched into the first dielectric sealing layer. Finally, top electrode 106 is deposited over all or a portion of lid 104. As mentioned previously, however, in an alternate embodiment, top electrode 106 (and a protective dielectric layer) is deposited prior to formation of the dielectric sealing layer.

In summary, what has been described is a MEMS varactor device comprising: a substrate; a first capacitive plate formed on said substrate; a flexible structure coupled to the substrate; a second capacitive plate and a first electrode formed on the flexible structure; and a package seal coupled to the substrate and having a second electrode formed thereon, wherein a distance between the first capacitive plate and the second capacitive plate is responsive to a bias voltage applied between the first electrode and the second electrode. The structure might also include a third electrode formed on the substrate, wherein the second electrode and the third electrode are substantially aligned. The second electrode may be formed on the external surface or internal surface of the package seal. If formed on the internal surface, a dielectric layer may be formed on the second electrode within the package.

In one embodiment, the flexible structure is a rectangular structure, wherein the flexible structure is coupled to the substrate at two opposite sides of the rectangular structure. The flexible structure may also be coupled to the substrate at each corner of the rectangular structure.

In a particular embodiment, the first electrode comprises a plurality of electrode segments. In another, the first electrode comprises a single electrode segment substantially surrounding the second capacitive plate.

A method for forming a MEMS varactor device in accordance with one embodiment comprises: providing a substrate; forming a first capacitive plate on the substrate; forming a flexible structure coupled to the substrate; forming a second capacitive plate and a first electrode on the flexible structure; forming a package seal coupled to the substrate, wherein the package seal encapsulates the first capacitive plate and the flexible structure; and forming a second electrode on the package seal. In one embodiment, the second electrode is formed on an external surface of the package seal. In another, the second electrode is formed on an internal surface of the package seal, and the method further includes forming a dielectric layer on the second electrode. A third electrode may be formed on the substrate.

One embodiment includes forming a substantially rectangular structure having a perimeter, wherein the rectangular structure is anchored to the substrate at two or more points along its perimeter. The method may include forming one or more conductive traces to the first electrode, the second electrode, the third electrode, the first capacitive plate, and the second capacitive plate.

In accordance with one embodiment, a MEMS varactor comprises: a substrate; a first capacitive plate and a bottom electrode formed on the substrate; a flexible structure coupled to the substrate; a second capacitive plate and a middle electrode formed on the flexible structure, wherein the second capacitive plate and the first capacitive plate are separated by an inter-plate distance; a package seal coupled to the substrate, said package seal encompassing the first capacitive plate and the flexible structure; a top electrode formed on the package seal; wherein the inter-plate distance is configured to increase when a bias voltage is applied between the top electrode and the middle electrode, and is configured to decrease when a bias voltage is applied between the middle electrode and the bottom electrode. In a particular embodiment, the middle electrode comprises a single electrode segment substantially encompassing the first capacitive plate.

In one embodiment, the flexible structure comprises a dielectric material. The flexible structure may, for example, have a shape selected from the group consisting of a cantilever structure, a bridge structure, and a trampoline structure.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention as set forth in the appended claims and the legal equivalents thereof.

What is claimed is:

1. A MEMS varactor device comprising:
   a substrate;
   a first capacitive plate formed on said substrate;
   a flexible structure coupled to the substrate;
   a second capacitive plate and a first electrode formed on the flexible structure; and
   a package seal coupled to the substrate and having a second electrode formed thereon, wherein a distance between the first capacitive plate and the second capacitive plate is responsive to a bias voltage applied between the first electrode and the second electrode.

2. The device of claim 1, further including a third electrode formed on the substrate.

3. The device of claim 2, wherein the second electrode and the third electrode are substantially aligned.

4. The device of claim 1, wherein the package seal has an external surface, and wherein the second electrode is formed on the external surface.

5. The device of claim 1, wherein the package seal has an internal surface, the second electrode is formed on the internal surface, and a dielectric layer is formed on the second electrode.

6. The device of claim 1, wherein the flexible structure is a rectangular structure.

7. The device of claim 6, wherein the flexible structure is coupled to the substrate at two opposite sides of the rectangular structure.

8. The device of claim 6, wherein the flexible structure is coupled to the substrate at each corner of the rectangular structure.

9. The device of claim 1, wherein the first electrode comprises a plurality of electrode segments.

10. The device of claim 1, wherein the first electrode comprises a single electrode segment substantially surrounding the second capacitive plate.

11. A method for forming a MEMS varactor device, comprising:
   providing a substrate;
   forming a first capacitive plate on the substrate;
   forming a flexible structure coupled to the substrate;
   forming a second capacitive plate and a first electrode on the flexible structure;
   forming a package seal coupled to the substrate, wherein the package seal encapsulates the first capacitive plate and the flexible structure; and
   forming a second electrode on the package seal.

12. The method of claim 11, wherein the second electrode is formed on an external surface of the package seal.

13. The method of claim 11, wherein the second electrode is formed on an internal surface of the package seal, further including forming a dielectric layer on the second electrode.

14. The method of claim 11, wherein forming the flexible structure includes forming a substantially rectangular structure having a perimeter, wherein the rectangular structure is anchored to the substrate at two or more points along its perimeter.

15. The method of claim 11, further including forming a third electrode on the substrate.

16. The method of claim 15, further including forming one or more conductive traces to the first electrode, the second electrode, the third electrode, the first capacitive plate, and the second capacitive plate.

17. A MEMS varactor comprising:
   a substrate;
   a first capacitive plate and a bottom electrode formed on the substrate;
   a flexible structure coupled to the substrate;
   a second capacitive plate and a middle electrode formed on the flexible structure, wherein the second capacitive plate and the first capacitive plate are separated by an inter-plate distance;
   a package seal coupled to the substrate, said package seal encompassing the first capacitive plate and the flexible structure;
   a top electrode formed on the package seal; and
   wherein the inter-plate distance is configured to increase when a bias voltage is applied between the top electrode and the middle electrode, and is configured to decrease when a bias voltage is applied between the middle electrode and the bottom electrode.

18. The MEMS varactor of claim 17, wherein the flexible structure comprises a dielectric material.

19. The MEMS varactor of claim 17, wherein the shape of the flexible structure is selected from the group consisting of a cantilever structure, a bridge structure, and a trampoline structure.

20. The MEMS varactor of claim 17, wherein the middle electrode comprises a single electrode segment substantially encompassing the first capacitive plate.

* * * * *